United States Patent
Tokuyama et al.

(10) Patent No.: US 12,027,885 B2
(45) Date of Patent: Jul. 2, 2024

(54) POWER TRANSMITTING DEVICE AND POWER TRANSMITTING METHOD

(71) Applicant: TOYODA GOSEI CO., LTD., Kiyosu (JP)

(72) Inventors: Yuki Tokuyama, Kiyosu (JP); Shinichiro Fuki, Kiyosu (JP); Tomokazu Sakai, Kiyosu (JP); Atsushi Sugihara, Kiyosu (JP); Kazuhito Kawamura, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 33 days.

(21) Appl. No.: 18/154,190

(22) Filed: Jan. 13, 2023

(65) Prior Publication Data

US 2023/0246487 A1  Aug. 3, 2023

(30) Foreign Application Priority Data

Jan. 28, 2022 (JP) ................................. 2022-011597

(51) Int. Cl.
*H02J 50/60* (2016.01)
*H02J 7/00* (2006.01)
*H02J 50/70* (2016.01)

(52) U.S. Cl.
CPC .......... *H02J 50/60* (2016.02); *H02J 7/00712* (2020.01); *H02J 50/70* (2016.02)

(58) Field of Classification Search
CPC .... H02J 50/60; H02J 50/70; H02J 7/00; H02J 7/00712
See application file for complete search history.

(56) References Cited

U.S. PATENT DOCUMENTS

| | | |
|---|---|---|
| 2016/0127012 A1 | 5/2016 | Shylendra et al. |
| 2016/0156388 A1 | 6/2016 | Zeine et al. |
| 2016/0299210 A1 | 10/2016 | Zeine |
| 2016/0299549 A1 | 10/2016 | Zeine et al. |
| 2016/0300547 A1 | 10/2016 | El-Rukby et al. |
| 2016/0301217 A1 | 10/2016 | Zeine et al. |
| 2016/0301240 A1 | 10/2016 | Zeine et al. |
| 2016/0301243 A1 | 10/2016 | Zeine et al. |
| 2016/0301255 A1 | 10/2016 | Zeine |
| 2016/0301256 A1 | 10/2016 | Zeine et al. |
| 2016/0301258 A1 | 10/2016 | Zeine et al. |

(Continued)

FOREIGN PATENT DOCUMENTS

JP 6725531 B2 7/2020

*Primary Examiner* — Robert L Deberadinis
(74) *Attorney, Agent, or Firm* — Posz Law Group, PLC

(57) ABSTRACT

A power transmitting device performs power transmission to a power receiving device. The power receiving device is provided in a space that a person can enter or exit. The power transmitting device includes a power transmitting unit, a processing circuitry, and a reception unit. The power transmitting unit is configured to perform power transmission to the power receiving device through contactless power supply. The processing circuitry is configured to switch a power transmission mode of the power transmitting unit between a normal-output mode and a limit mode in which a transmitted power is more limited than in the normal-output mode. The reception unit is configured to receive a limit instruction for the power transmission given by the person. The processing circuitry is configured to set the power transmission mode to the limit mode when the reception unit receives the limit instruction.

5 Claims, 6 Drawing Sheets

(56) References Cited

U.S. PATENT DOCUMENTS

| | | |
|---|---|---|
| 2016/0301259 A1 | 10/2016 | Zeine et al. |
| 2016/0301264 A1 | 10/2016 | Zeine et al. |
| 2017/0041046 A1 | 2/2017 | Shylendra et al. |
| 2017/0141620 A1 | 5/2017 | Zeine et al. |
| 2017/0141621 A1 | 5/2017 | Zeine et al. |
| 2017/0187231 A1 | 6/2017 | Zeine et al. |
| 2017/0187249 A1 | 6/2017 | Zeine et al. |
| 2018/0255596 A1 | 9/2018 | Zeine et al. |
| 2018/0259615 A1 | 9/2018 | Zeine |
| 2018/0366085 A1 | 12/2018 | Zeine et al. |
| 2019/0020199 A1 | 1/2019 | Zeine et al. |
| 2019/0140490 A1 | 5/2019 | Zeine et al. |
| 2019/0157915 A1 | 5/2019 | Zeine et al. |
| 2019/0197984 A1 | 6/2019 | Zeine et al. |
| 2019/0199404 A1 | 6/2019 | Shylendra et al. |
| 2019/0305604 A1 | 10/2019 | Zeine et al. |
| 2020/0296780 A1 | 9/2020 | Zeine et al. |
| 2020/0303954 A1 | 9/2020 | Zeine et al. |
| 2021/0049975 A1 | 2/2021 | El-Rukby et al. |
| 2021/0063525 A1 | 3/2021 | Zeine |
| 2021/0249903 A1 | 8/2021 | Zeine et al. |
| 2021/0249908 A1 | 8/2021 | Zeine et al. |
| 2021/0321472 A1 | 10/2021 | Zeine et al. |
| 2021/0373117 A1 | 12/2021 | Zeine |

POWER TRANSMITTING DEVICE AND POWER TRANSMITTING METHOD

BACKGROUND

1. Field

The present disclosure relates to a power transmitting device and a power transmitting method.

2. Description of Related Art

A typical contactless power supply system includes a power transmitting device and a power receiving device. The power transmitting device transmits power through contactless power supply. The power receiving device receives the power transmitted by the power transmitting device.

When power transmission is performed through contactless power supply, the power transmitting device may be required to suppress exposure of a human body to electromagnetic waves.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a power transmitting device that performs power transmission to a power receiving device is provided. The power receiving device is provided in a space that a person can enter or exit. The power transmitting device includes a power transmitting unit, processing circuitry, and a reception unit. The power transmitting unit is configured to perform power transmission to the power receiving device through contactless power supply. The processing circuitry is configured to switch a power transmission mode of the power transmitting unit between a normal-output mode and a limit mode in which a transmitted power is more limited than in the normal-output mode. The reception unit is configured to receive a limit instruction for the power transmission given by the person. The processing circuitry is configured to set the power transmission mode to the limit mode when the reception unit receives the limit instruction.

In another general aspect, a power transmitting method of performing power transmission to a power receiving device is provided. The power receiving device is provided in a space that a person can enter or exit. The power transmitting method includes performing power transmission to the power receiving device through contactless power supply, switching a power transmission mode that is used when the power transmission is performed between a normal-output mode and a limit mode in which a transmitted power is more limited than in the normal-output mode, and receiving a limit instruction for the power transmission given by the person. The switching the power transmission mode includes setting the power transmission mode to the limit mode when the limit instruction is received.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

First Embodiment

A power transmitting device according to a first embodiment will now be described.

<Vehicle>

Figure 1:
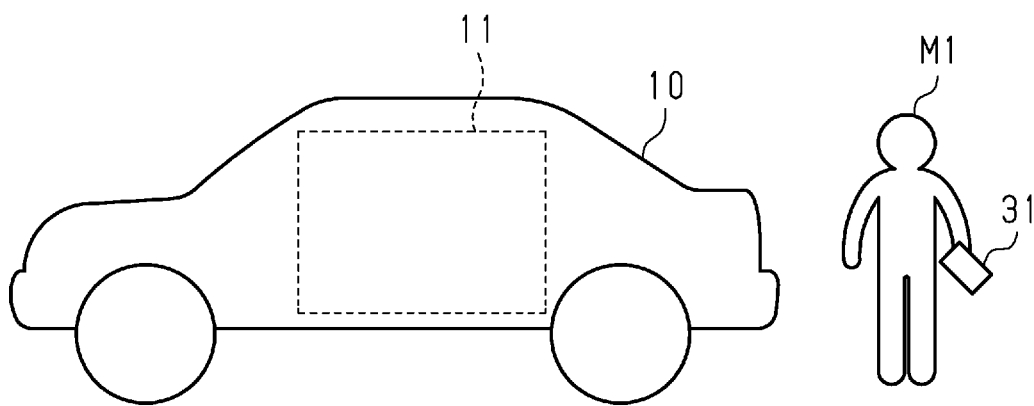
FIG. 1 is a schematic diagram of a vehicle according to a first embodiment.

As shown in FIG. 1, a vehicle 10 includes a passenger compartment 11. The passenger compartment 11 is a space that a person M1 can enter or exit.

<Keyless Entry System 20>

Figure 2:
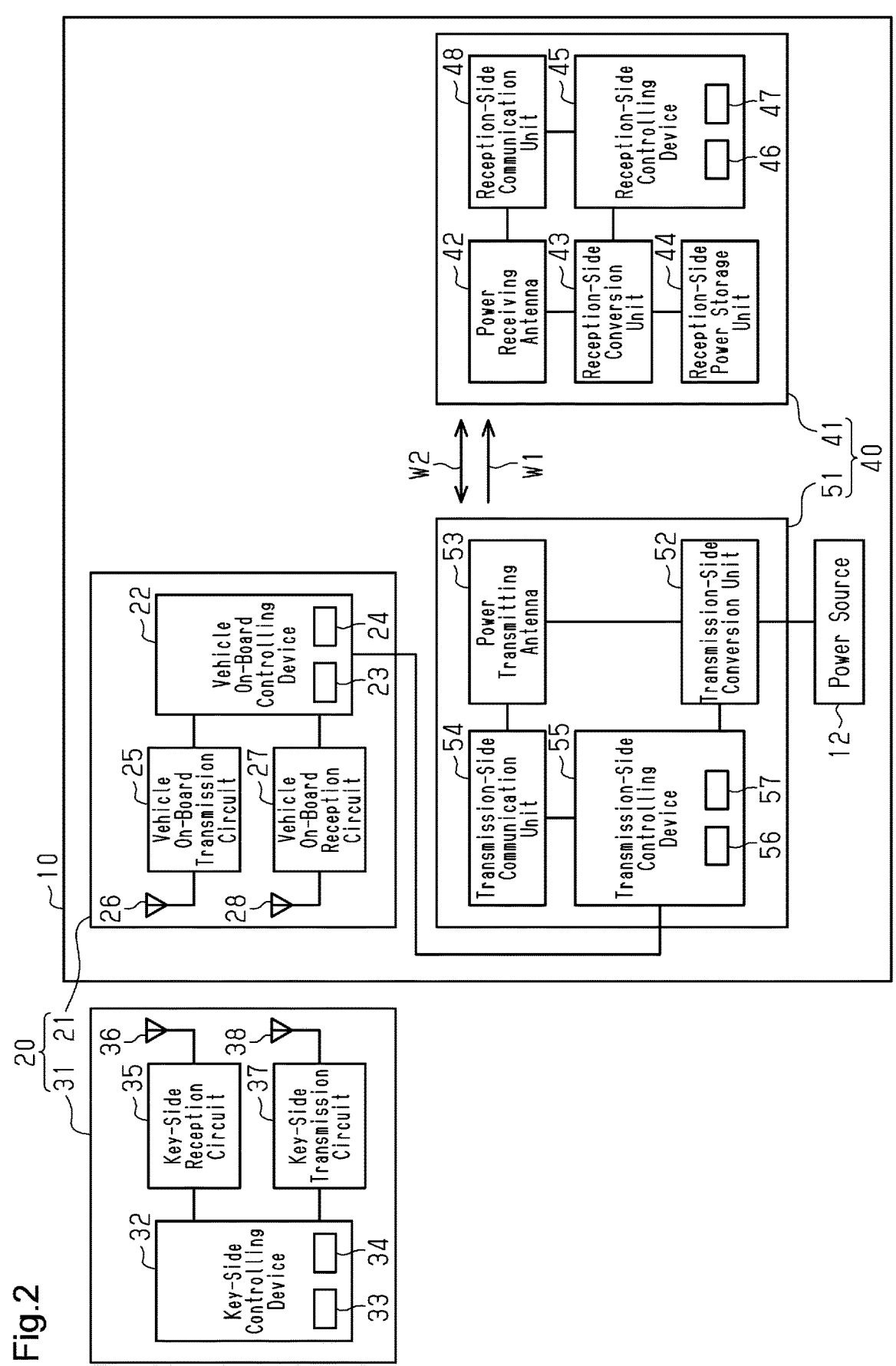
FIG. 2 is a schematic diagram of a keyless entry system and a contactless power supply system employed for the vehicle shown in FIG. 1.

As shown in FIG. 2, the vehicle 10 is configured to be locked and unlocked with a keyless entry system 20. The keyless entry system 20 includes a vehicle on-board device 21 and an electronic key 31. The vehicle on-board device 21 is mounted on the vehicle 10. The vehicle on-board device 21 includes a vehicle on-board controlling device 22, a vehicle on-board transmission circuit 25, a vehicle on-board transmission antenna 26, a vehicle on-board reception circuit 27, and a vehicle on-board reception antenna 28.

The vehicle on-board controlling device 22 includes a processor 23 and a memory unit 24. The memory unit 24 includes a random-access memory (RAM) and a read-only memory (ROM). The memory unit 24 stores program codes or commands configured to cause the processor 23 to perform processes. The memory unit 24, which is a computer-readable medium, includes any type of medium that is accessible by a general-purpose computer or a dedicated computer. The vehicle on-board controlling device 22 may include a hardware circuit such as an application specific integrated circuit (ASIC) and a field programmable gate array (FPGA). The vehicle on-board controlling device 22, which is processing circuitry, may include one or more processors that operate according to a computer program, one or more hardware circuits such as an ASIC and an FPGA, or a combination thereof. The memory unit 24 stores identification information of the electronic key 31.

The vehicle on-board transmission circuit 25 transmits a search signal from the vehicle on-board transmission antenna 26 to the electronic key 31. Specifically, the vehicle on-board transmission circuit 25 modulates the search signal based on data input from the vehicle on-board controlling device 22 and transmits the modulated search signal from the vehicle on-board transmission antenna 26. The search signal is a signal for requesting the electronic key 31 to transmit a response signal. The search signal is, for example, a signal in a low-frequency (LF) band.

The vehicle on-board reception circuit 27 receives a response signal transmitted from the electronic key 31 via the vehicle on-board reception antenna 28. The response signal is, for example, a signal in an ultra high frequency (UHF) band. The response signal includes, for example, identification information set for the electronic key 31. The vehicle on-board reception circuit 27 outputs data obtained by demodulating the response signal to the vehicle on-board controlling device 22.

The vehicle on-board controlling device 22 collates the identification information. The vehicle on-board controlling device 22 determines whether the identification information included in the response signal agrees with the identification information stored in the memory unit 24. The vehicle on-board controlling device 22 determines that the electronic key 31 whose identification information agrees with the identification information stored in the memory unit 24 is a registered key. The registered key is the electronic key 31 that corresponds to the vehicle 10. The vehicle on-board controlling device 22 performs unlocking and locking in response to a command from the registered key.

The electronic key 31 is carried by the person M1, who is a user of the vehicle 10. The electronic key 31 is a device carried by the person M1. The electronic key 31 includes a key-side controlling device 32, a key-side reception circuit 35, a key-side reception antenna 36, a key-side transmission circuit 37, and a key-side transmission antenna 38.

The key-side controlling device 32 includes a processor 33 and a memory unit 34. The hardware configuration of the key-side controlling device 32 is, for example, similar to that of the vehicle on-board controlling device 22. The memory unit 34 stores identification information of the electronic key 31. The identification information is an ID code unique to the electronic key 31.

The key-side reception circuit 35 receives the search signal via the key-side reception antenna 36. The key-side reception circuit 35 outputs data obtained by demodulating the search signal to the key-side controlling device 32.

The key-side transmission circuit 37 transmits a response signal from the key-side transmission antenna 38 to the vehicle on-board device 21. Specifically, the key-side transmission circuit 37 modulates the response signal based on the data input from the key-side controlling device 32 and transmits the modulated response signal from the key-side transmission antenna 38. The response signal includes the identification information. The key-side transmission circuit 37 may be capable of transmitting a request signal including information requesting locking or information requesting unlocking.

<Contactless Power Supply System 40>

The contactless power supply system 40 includes a power receiving device 41 and a power transmitting device 51. The number of the power receiving device 41 may be one or more. The number of the power transmitting device 51 may be one or more. The contactless power supply system 40 is a system in which the power transmitting device 51 supplies power to the power receiving device 41 through contactless power supply using a power transfer signal W1. The power transfer signal W1 is transmitted as a wireless signal from the power transmitting device 51 to the power receiving device 41. The power transfer signal W1 of the present embodiment includes microwaves. Microwaves are electromagnetic waves.

<Power Receiving Device 41>

The power receiving device 41 includes a power receiving antenna 42, a reception-side conversion unit 43, a reception-side power storage unit 44, a reception-side controlling device 45, and a reception-side communication unit 48. The power receiving device 41 may be any object that operates when supplied with power, such as a toy, a lighting device, a smartphone, or a wearable terminal. The power receiving device 41 is located in the passenger compartment 11.

<Power Receiving Antenna 42>

The power receiving antenna 42 is configured to receive the power transfer signal W1. The power receiving antenna 42 may be a monopole antenna, a dipole antenna, a helical antenna, a parabolic antenna, or an antenna array including multiple antennas. The power receiving antenna 42 converts the power transfer signal W1 into AC power. The power receiving antenna 42 is configured to transmit and receive a communication signal W2. The power receiving antenna 42 that receives the power transfer signal W1 may be provided separately from an antenna that transmits and receives the communication signal W2.

<Reception-Side Conversion Unit 43>

The reception-side conversion unit 43 converts the AC power output by the power receiving antenna 42 into received power. The received power is power that the power receiving device 41 has obtained from the power transfer signal W1. The received power is DC power. Specific configuration of the reception-side conversion unit 43 is not particularly limited, and may include, for example, a rectifier circuit and a smoothing circuit.

<Reception-Side Power Storage Unit 44>

The reception-side power storage unit 44 is a power source of the power receiving device 41. The reception-side power storage unit 44 may be, for example, a rechargeable battery, such as a lithium-ion storage battery and a capacitor. The reception-side power storage unit 44 stores part or all of the received power, which has been converted by the reception-side conversion unit 43. In this manner, power is received by the power receiving device 41 using the power transfer signal W1.

<Reception-Side Controlling Device 45>

The reception-side controlling device 45 includes a processor 46 and a memory unit 47. The hardware configuration of the reception-side controlling device 45 is, for example, similar to that of the vehicle on-board controlling device 22.

<Reception-Side Communication Unit 48>

The reception-side communication unit 48 communicates with the power transmitting device 51 through transmission and reception of the communication signal W2. The reception-side communication unit 48 demodulates the communication signal W2 received by the power receiving antenna 42, and outputs the demodulated communication signal W2 to the reception-side controlling device 45. Also, the reception-side communication unit 48 modulates the communication signal W2 based on the data output by the reception-side controlling device 45 and transmits the modulated communication signal W2 from the power receiving antenna 42. The communication signal W2 of the present embodiment is implemented by a beacon signal. The mode of communication of the communication signal W2 may be any mode. Examples of such a mode include modes according to communication standards such as Bluetooth (registered trademark), Wi-Fi, or ZigBee (registered trademark).

<Power Transmitting Device 51>

The power transmitting device 51 performs contactless power supply to the power receiving device 41 using the power transfer signal W1. The power transmitting device 51 includes a transmission-side conversion unit 52, a power transmitting antenna 53, a transmission-side communication unit 54, and a transmission-side controlling device 55.

<Transmission-Side Conversion Unit 52>

The transmission-side conversion unit 52 converts power supplied from a power source 12 into an electric signal corresponding to the power transfer signal W1, and outputs the power transfer signal W1. The electric signal may be defined by any manner such as voltage, current, or power. The specific configuration of the transmission-side conversion unit 52 is not particularly limited. For example, the transmission-side conversion unit 52 includes circuitry including switching elements such as chopper circuits. Through control of the switching elements of the transmission-side conversion unit 52, the transmission-side conversion unit 52 outputs DC power supplied from the power source 12 as an electric signal of AC power. That is, the transmission-side conversion unit 52 functions as a DC/AC inverter. The transmission-side conversion unit 52 includes a power conversion unit that supplies power to the transmission-side controlling device 55. The transmission-side conversion unit 52 supplies power required to drive the transmission-side controlling device 55.

The power source 12 is mounted on the vehicle 10. The power source 12 may be, for example, a battery for auxiliary devices that supplies power to electrical components. If the vehicle 10 is a battery electric vehicle, the power source 12 may be the battery for traveling that supplies power to the traveling motor. The power source 12 may be a power source provided for the power transmitting device 51. Also, the power source 12 may be a generator mounted on the vehicle 10. The power source 12 may be a combination of any of the above.

<Power Transmitting Antenna 53>

The power transmitting antenna 53 is configured to transmit the power transfer signal W1 to the power receiving device 41. The power transmitting antenna 53 converts the electric signal output from the transmission-side conversion unit 52 into the power transfer signal W1 and transmits the power transfer signal W1. The power transmitting antenna 53 may be a monopole antenna, a dipole antenna, a helical antenna, a parabolic antenna, or an antenna array including multiple antennas. The power transmitting antenna 53 of the present embodiment is a phased array antenna including multiple antennas. The power transmitting antenna 53 converts power output from the transmission-side conversion unit 52 into the power transfer signal W1 and transmits the power transfer signal W1 through wireless transmission. Accordingly, the power transmitting device 51 supplies transmitted power to the power receiving device 41. The transmitted power is power transmitted as the power transfer signal W1. Also, the power transmitting antenna 53 is configured to transmit and receive the communication signal W2. The power transmitting antenna 53 that transmits the power transfer signal W1 may be provided separately from an antenna that transmits and receives the communication signal W2.

<Transmission-Side Communication Unit 54>

The transmission-side communication unit 54 is configured to transmit and receive the communication signal W2. Specifically, the transmission-side communication unit 54 demodulates the communication signal W2 received by the power transmitting antenna 53, and outputs the demodulated communication signal W2 to the transmission-side controlling device 55. The transmission-side communication unit 54 modulates the communication signal W2 based on the data output by the transmission-side controlling device 55 and transmits the modulated communication signal W2 from the power transmitting antenna 53. Thus, the power transmitting device 51 and the power receiving device 41 are configured to communicate with each other via the communication signal W2.

<Transmission-Side Controlling Device 55>

The transmission-side controlling device 55 includes a processor 56 and a memory unit 57. The hardware configuration of the transmission-side controlling device 55 is, for example, similar to that of the vehicle on-board controlling device 22. The transmission-side controlling device 55 is configured to communicate with the vehicle on-board controlling device 22. The transmission-side controlling device 55 and the vehicle on-board controlling device 22 communicate with each other using a communication protocol such as a controller area network (CAN) or a local interconnect network (LIN).

The transmission-side controlling device 55, which is processing circuitry, is capable of adjusting the transmitted power. The transmission-side controlling device 55 controls the transmitted power by controlling the power transmitting antenna 53, for example. When the power transmitting antenna 53 is a phased array antenna, the transmission-side controlling device 55 adjusts the transmitted power by adjusting the number of antennas that perform power transmission among the antennas in the phased array antenna. The transmitted power may be adjusted by controlling the transmission-side conversion unit 52 to adjust the power input to the power transmitting antenna 53. The transmission-side controlling device 55 is thus capable of adjusting the transmitted power by controlling at least one of the transmission-side conversion unit 52 and the power transmitting antenna 53. The transmission-side conversion unit 52 and the power transmitting antenna 53 are power transmitting units.

<Power Transmission Mode>

The transmission-side controlling device 55 switches the power transmission mode of the power transmitting units between multiple power transmission modes. The power transmission modes include a normal-output mode and a limit mode. The normal-output mode is a mode in which the transmitted power is not limited. In the normal-output mode, for example, predetermined transmitted power is output. The magnitude of the transmitted power may change in accordance with the power input from the power source 12. The limit mode is a mode in which the transmitted power is more limited than in the normal-output mode. The limitation of the transmitted power includes a mode in which no power is transmitted. The limit mode of the present embodiment is a stop mode in which power transmission is not performed. In the stop mode, power transmission is not performed, but the operation of the transmission-side controlling device 55 is partially continued. The operation of the transmission-side controlling device 55 that is continued even during the stop mode may include, for example, transmission and reception of the communication signal W2, calculation related to the direction of power transmission in which the power transfer signal W1 is transmitted, and storing of a history related to communication and calculation results in the memory unit 57. The transmission-side controlling device 55 switches between the normal-output mode and the stop mode in accordance with communication with the vehicle on-board controlling device 22. Then, the transmission-side controlling device 55 adjusts the transmitted power in accordance with the power transmission mode. Hereinafter, control performed by the vehicle on-board controlling device 22 and the transmission-side controlling device 55 to switch the power transmission mode will be described.

<Inside/Outside Determining Control>

The vehicle on-board controlling device 22 performs an inside/outside determining control. The inside/outside determining control is a control for determining whether the registered key is present inside the passenger compartment 11.

Figure 3:
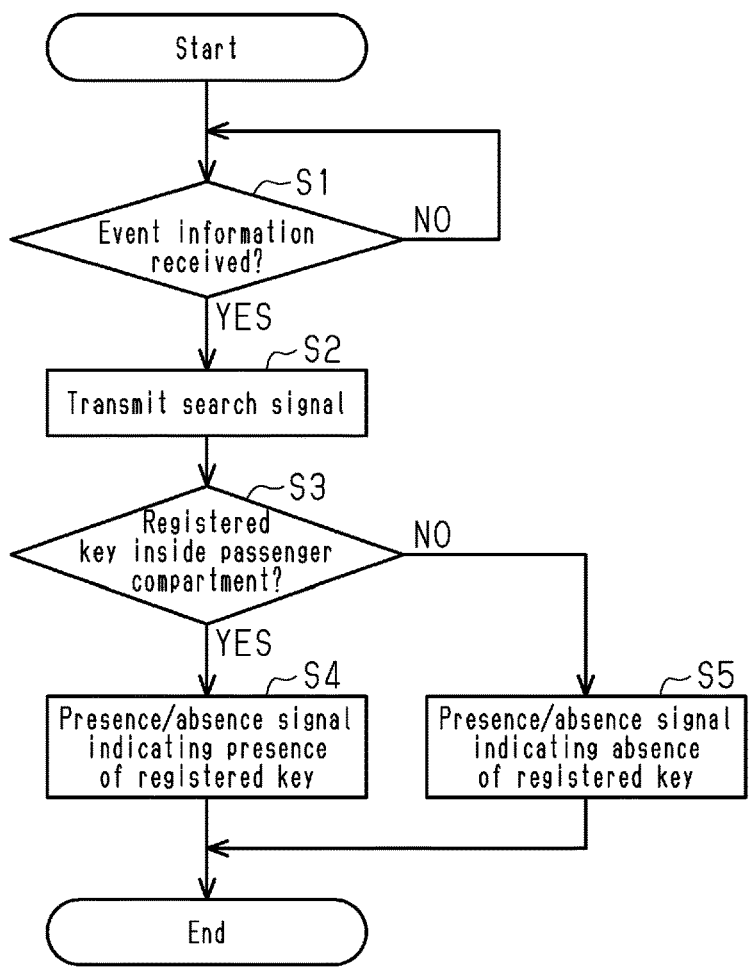
FIG. 3 is a flowchart showing an inside/outside determining control performed by a vehicle on-board controlling device mounted on the vehicle shown in FIG. 1.

As shown in FIG. 3, the vehicle on-board controlling device 22 determines whether event information has been received in step S1. The event information may include, for example, reception of a wake-up signal from a vehicle on-board device other than the vehicle on-board controlling device 22, reception of a response signal, reception of a request signal, operation of the ignition switch, opening/closing of a door, reception of seating information, or activation of the vehicle 10. If the determination result of step S1 is negative, the vehicle on-board controlling device 22 performs the process of step S1 again. If the determination result of step S1 is affirmative, the vehicle on-board controlling device 22 performs the process of step S2.

<Step S2>

In step S2, the vehicle on-board controlling device 22 transmits the search signal from the vehicle on-board transmission circuit 25.

<Step S3>

Next, in step S3, the vehicle on-board controlling device 22 determines whether the registered key is present inside the passenger compartment 11. Whether the registered key is present inside the passenger compartment 11 can be determined by various methods.

The determination as to whether the registered key is present inside the passenger compartment 11 may be performed by transmitting the search signal to the interior and the outside of the passenger compartment 11. In this case, multiple vehicle on-board transmission antennas 26 are provided. The vehicle on-board transmission antennas 26 include a vehicle on-board transmission antenna 26 that transmits a search signal into the passenger compartment 11 and a vehicle on-board transmission antenna 26 that transmits a search signal to the outside of the passenger compartment 11. When receiving the response signal that corresponds to the search signal transmitted into the passenger compartment 11, the vehicle on-board controlling device 22 determines that the registered key is present inside the passenger compartment 11. When receiving the response signal that corresponds to the search signal transmitted to the outside of the passenger compartment 11, the vehicle on-board controlling device 22 determines that the registered key is present outside the passenger compartment 11. When failing to receive the response signal that corresponds to the search signal, the vehicle on-board controlling device 22 determines that the registered key is present outside the passenger compartment 11. Whether the response signal corresponds to the search signal transmitted into the passenger compartment 11 or to the search signal transmitted to the outside of the passenger compartment 11 can be determined by various methods. For example, the vehicle on-board controlling device 22 may alternately transmit the search signal into the passenger compartment 11 and transmit the search signal to the outside of the passenger compartment 11 at time intervals. This allows the vehicle on-board controlling device 22 to determine in response to which search signal corresponds to the response signal was transmitted. The registered key may transmit a response signal that includes area information. The area information is information indicating whether the position at which the registered key has received the search signal is outside or inside the passenger compartment 11. The area information allows the vehicle on-board controlling device 22 to determine whether the registered key is present inside the passenger compartment 11.

Whether the registered key is present inside the passenger compartment 11 may be determined by providing multiple vehicle on-board reception antennas 28. In this case, the vehicle on-board reception antennas 28 include a vehicle on-board reception antenna 28 configured to receive the response signal from the registered key when the registered key is present inside the passenger compartment 11 and a vehicle on-board reception antenna 28 configured to receive the response signal from the registered key present when the registered key is present outside the passenger compartment 11. When the response signal is received by the vehicle on-board reception antenna 28 configured to receive the response signal from the registered key present inside the passenger compartment 11, the vehicle on-board controlling device 22 determines that the registered key is present inside the passenger compartment 11. When the response signal is received by the vehicle on-board reception antenna 28 configured to receive the response signal from the registered key present outside the passenger compartment 11, the vehicle on-board controlling device 22 determines that the registered key is present outside the passenger compartment 11. When the vehicle on-board reception circuit 27 fails to receive the response signal that corresponds to the search signals, the vehicle on-board controlling device 22 determines that the registered key is present outside the passenger compartment 11. The vehicle on-board controlling device 22 may determine whether the registered key is present inside the passenger compartment 11 from the reception strength of the response signal.

If the determination result of step S3 is affirmative, that is, if the registered key is present inside the passenger compartment 11, the vehicle on-board controlling device 22 performs the process of step S4. If the determination result of step S3 is negative, that is, if the registered key is not present inside the passenger compartment 11, the vehicle on-board controlling device 22 performs the process of step S5.

<Step S4>

In step S4, the vehicle on-board controlling device 22 transmits a presence/absence signal to the transmission-side controlling device 55. The presence/absence signal includes the determination result of step S3, that is, the determination result indicating whether the registered key is present inside the passenger compartment 11. In step S4, the presence/absence signal is transmitted that includes information indicating that the registered key is present in the passenger compartment 11.

In step S5, the vehicle on-board controlling device 22 transmits the presence/absence signal to the transmission-side controlling device 55. In step S5, the presence/absence signal is transmitted that includes information indicating that the registered key is absent from the passenger compartment 11. When completing the process of step S4 or step S5, the vehicle on-board controlling device 22 ends the inside/outside determining control.

<Switching Control>

The transmission-side controlling device 55 performs a switching control. The switching control is a control performed to set the power transmission mode to the normal-output mode or the stop mode.

<Step S11>

Figure 4:
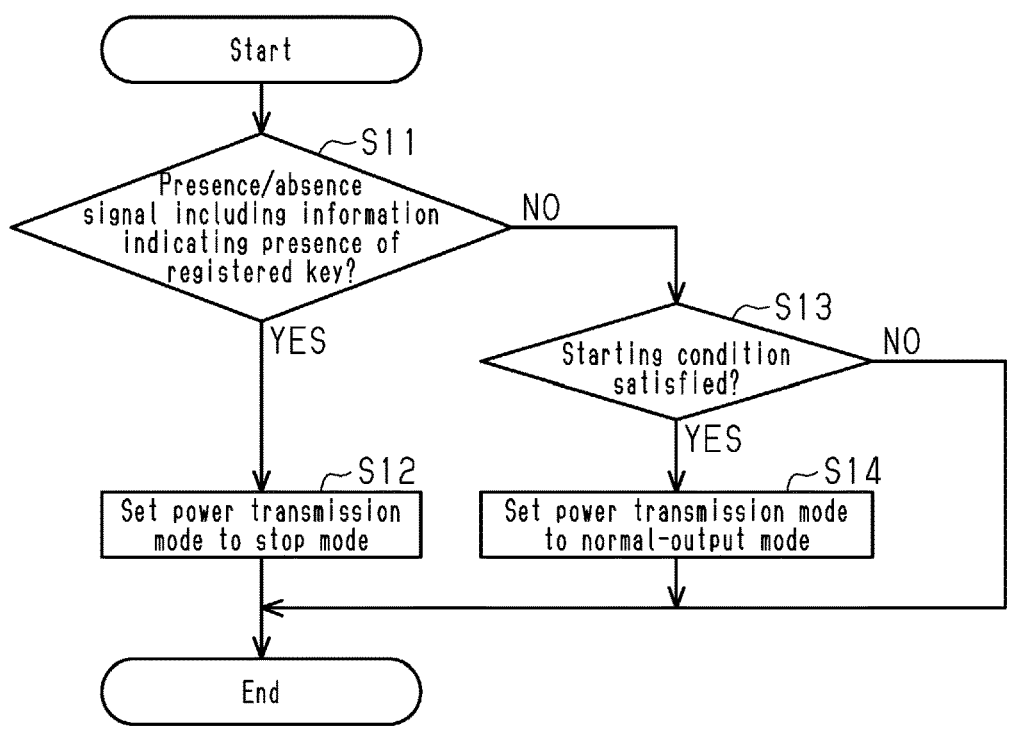
FIG. 4 is a flowchart showing a switching control performed by a transmission-side controlling device of the contactless power supply system shown in FIG. 2.

As shown in FIG. 4, in step S11, the transmission-side controlling device 55 determines whether the presence/absence signal received from the vehicle on-board controlling device 22 includes information indicating that the registered key is present inside the passenger compartment 11. In other words, the transmission-side controlling device 55 determines whether it has received the presence/absence signal that has been transmitted in step S4. This determination is a determination as to whether the registered key is present inside the passenger compartment 11. If the determination result of step S1 is affirmative, that is, if the registered key is present in the passenger compartment 11, the transmission-side controlling device 55 performs the process of step S12. If the determination result of step S12 is negative, that is, if the registered key is not present in the passenger compartment 11, the transmission-side controlling device 55 performs the process of step S13.

<Step S12>

In step S12, the transmission-side controlling device 55 sets the power transmission mode to the stop mode. Specifically, if the power transmission mode is the stop mode at the time of performing the process of step S12, the transmission-side controlling device 55 maintains the stop mode. If the power transmission mode is the normal-output mode at the time of performing the process of step S12, the transmission-side controlling device 55 switches the normal-output mode to the stop mode. When switching the normal-output mode to the stop mode, the transmission-side controlling device 55 executes a stopping process. The stopping process may include stopping of power transmission, storage of information related to the power receiving device 41 in the memory unit 57, and storage of a history related to communication and calculation results in the memory unit 57. When completing the process of step S12, the transmission-side controlling device 55 ends the switching control.

As described above, when the registered key is present inside the passenger compartment 11, the transmission-side controlling device 55 sets the power transmission mode to the stop mode. In the first embodiment, the person M1 entering the passenger compartment 11 while carrying the registered key is regarded as a limit instruction for limiting power transmission given by the person M1. The limit instruction is an instruction for requesting the power transmitting device 51 to limit the transmitted power. The vehicle on-board controlling device 22 is a determination device that determines whether the registered key is present inside the passenger compartment 11. The transmission-side controlling device 55 is configured to communicate with the vehicle on-board controlling device 22, thereby obtaining, from the vehicle on-board controlling device 22, a determination result as to whether the registered key is present inside the passenger compartment 11. The transmission-side controlling device 55 thus receives the limit instruction via the vehicle on-board controlling device 22. The transmission-side controlling device 55 is a reception unit. When the registered key is present inside the passenger compartment 11, the transmission-side controlling device 55 determines that the limit instruction has been received, and sets the power transmission mode to the stop mode.

<Step S13>

In step S13, the transmission-side controlling device 55 determines whether a starting condition is satisfied. The starting condition is a condition required to start power transmission in the normal-output mode when the power transmission mode is the stop mode. The starting condition is a condition for determining that the person M1 is not present in the passenger compartment 11 based on a factor other than the registered key. The starting condition may include, for example, that an action for opening and closing a door has been performed, that the ignition switch is off, that communication with a device connected to the transmission-side controlling device 55 is stopped, and that the registered key has been continuously absent from the passenger compartment 11 for a predetermined period of time or longer. The starting condition may include one or more conditions. When the starting condition includes multiple conditions, the transmission-side controlling device 55 may determine that the starting condition is satisfied when one of the conditions is satisfied, or may determine that the starting condition is satisfied when all the conditions are satisfied. If the determination result of step S13 is affirmative, the transmission-side controlling device 55 performs the process of step S14. If the determination result of step S13 is negative, the transmission-side controlling device 55 ends the switching control. In this case, the power transmission mode set at the time of performing the determination in step S13 is maintained.

<Step S14>

In step S14, the transmission-side controlling device 55 sets the power transmission mode to the normal-output mode. Specifically, if the power transmission mode is the normal-output mode at the time of performing the process of step S14, the transmission-side controlling device 55 maintains the normal-output mode. If the power transmission mode is the stop mode at the time of performing the process of step S14, the transmission-side controlling device 55 switches the stop mode to the normal-output mode. When completing the process of step S14, the transmission-side controlling device 55 ends the switching control.

Operation of First Embodiment

Operation of the first embodiment will now be described.

When the person M1 carrying the registered key enters the passenger compartment 11, the vehicle on-board controlling device 22 determines that the registered key is present inside the passenger compartment 11. When the vehicle on-board controlling device 22 determines that the registered key is present inside the passenger compartment 11, the transmission-side controlling device 55 sets the power transmission mode to the stop mode. When the person M1 is in the passenger compartment 11, the power transmission from the power transmitting device 51 is not performed. As described above, the transmission-side controlling device 55 regards the person M1 entering the passenger compartment 11 while carrying the registered key as the limit instruction for limiting power transmission given by the person M1, and limits the transmitted power.

When the person M1 carrying the registered key exits the passenger compartment 11, the vehicle on-board controlling device 22 determines that the registered key is not present inside the passenger compartment 11. The transmission-side controlling device 55 sets the power transmission mode to the normal-output mode when it is determined that the registered key is not present inside the passenger compartment 11 and the starting condition is satisfied.

Advantages of First Embodiment

The first embodiment has the following advantages.

(1-1) When receiving the limit instruction from the person M1, the transmission-side controlling device 55 sets the power transmission mode to the stop mode. When the person M1 is present inside the passenger compartment 11, it is possible to reduce human exposure to electromagnetic waves as compared with a case in which the power transmission mode is set to the normal-output mode.

(1-2) The transmission-side controlling device 55 is configured to obtain information from the vehicle on-board controlling device 22. The vehicle on-board controlling device 22 transmits, to the transmission-side controlling device 55, a determination result as to whether the registered key carried by the person M1 is present inside the passenger compartment 11. Thus, the transmission-side controlling device 55 determines whether the registered key is present inside the passenger compartment 11. The transmission-side controlling device 55 determines to have received the limit instruction if the registered key is present inside the passenger compartment 11. The person M1 can set the power transmission mode to the stop mode only by entering the passenger compartment 11 while carrying the registered key. It is thus easy to set the power transmission mode to the stop mode.

(1-3) The transmission-side controlling device 55 sets the power transmission mode to the normal-output mode when the starting condition is satisfied. There may be a case in which the vehicle on-board controlling device 22 determines that the registered key is not present inside the passenger compartment 11 even though the registered key is present inside the passenger compartment 11 due to a communication failure of the registered key or the like. For example, when the vehicle on-board reception circuit 27 fails to receive the response signal from the registered key or when an error occurs in the data transmitted by the response signal, the vehicle on-board controlling device 22 may determine that the registered key is not present in the passenger compartment 11. If the power transmission mode is set to the normal-output mode immediately after it is determined that the registered key is not present inside the passenger compartment 11, the power transmission mode may be set to the normal-output mode even though the person M1 is present inside the passenger compartment 11. If the starting condition is set, the power transmission mode is not set to the normal-output mode until the starting condition is satisfied. The power transmission mode is prevented from being set to the normal-output mode despite the fact that the person M1 is present in the passenger compartment 11.

(1-4) The limit mode is the stop mode. Therefore, human exposure to electromagnetic waves is further suppressed.

Second Embodiment

A power transmitting device according to a second embodiment will now be described. Like or the same reference numerals are given to those components that are like or the same as the corresponding components of the first embodiment and explanations are omitted.

<Room 60>

Figure 5:
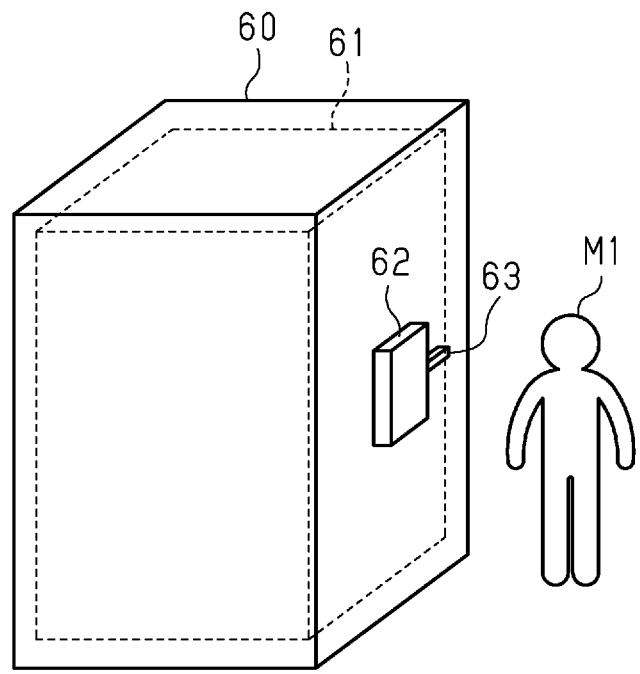
FIG. 5 is a schematic diagram of a room according to a second embodiment.

As shown in FIG. 5, a room 60 is a part of a building such as a home, a commercial facility, or a public facility, and is partitioned by walls. A room interior 61, which is the inner space of the room 60, is a space that a person M1 can enter or exit. A control panel 62 is provided outside the room 60.

<Control Panel 62>

Figure 6:
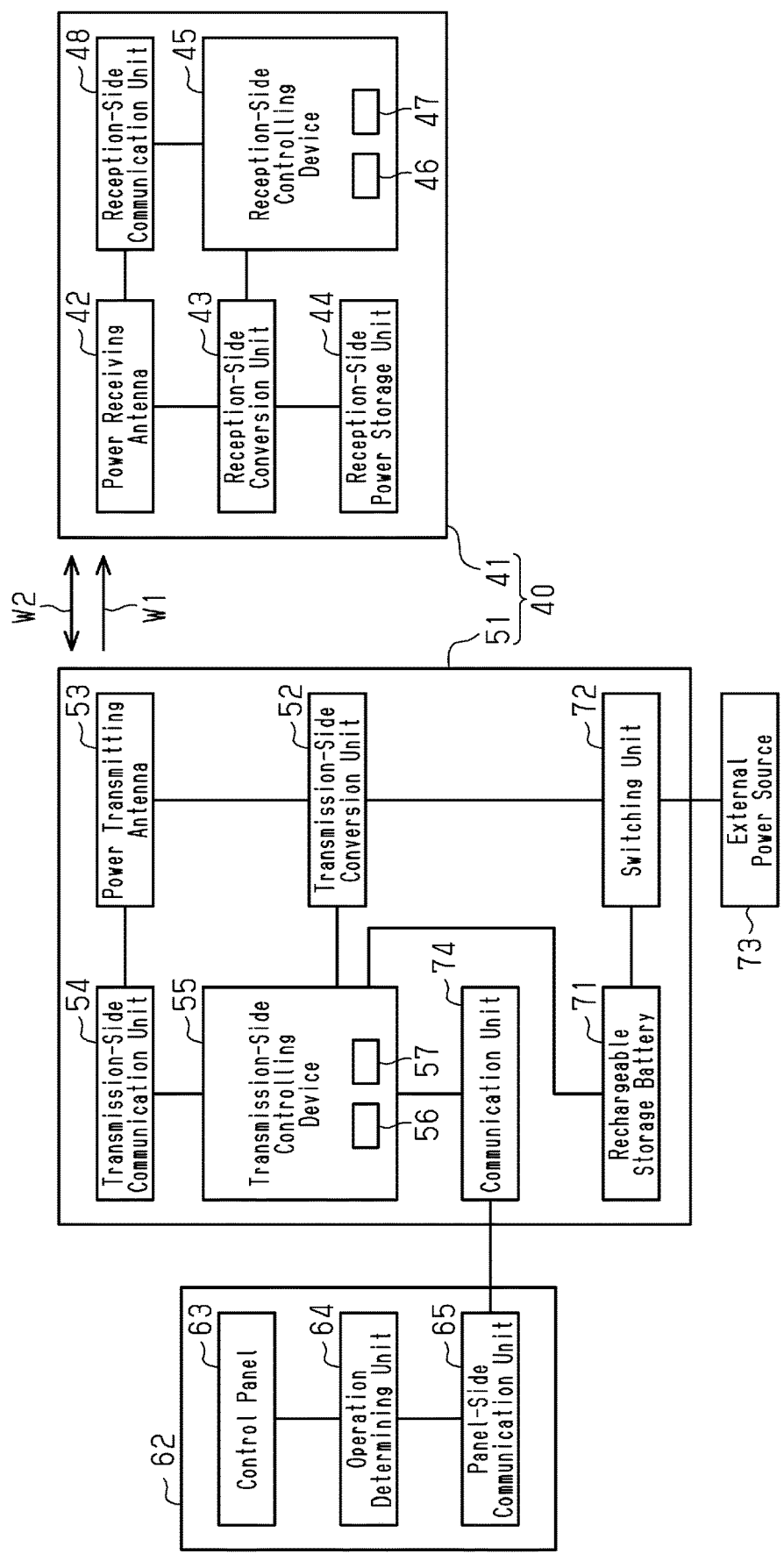
FIG. 6 is a schematic diagram of a control panel and a contactless power supply system employed for the room shown in FIG. 5.

As shown in FIG. 6, the control panel 62 includes an operation unit 63, an operation determining unit 64, and a panel-side communication unit 65.

The operation unit 63 is operated by the person M1. The operation unit 63 may include, for example, a lever, a switch, a push button, or a touch screen. The operation unit 63 is used to switch the power transmission mode. For example, when the operation unit 63 includes a lever, the power transmission mode corresponds to the position of the lever, and the person M1 can designate the power transmission mode by operating the lever to a specific position. In the present embodiment, the operation unit 63 is capable of switching between the normal-output mode and the stop mode.

The operation determining unit 64 determines whether the operation unit 63 has been operated. The operation determining unit 64 determines the power transmission mode designated by the person M1 based on operation performed on the operation unit 63. For example, when the operation unit 63 includes a lever, the operation determining unit 64 determines the power transmission mode designated by the person M1 from the position of the lever. The operation determining unit 64 may be, for example, a computer including a processor and a memory unit.

The panel-side communication unit 65 may perform communication according to any communication standards such as Bluetooth, Wi-Fi, or ZigBee.

<Power Transmitting Device 51>

The power transmitting device 51 includes a rechargeable storage battery 71, a switching unit 72, and a communication unit 74. The power transmitting device 51 transmits the power transfer signal W1 to the room interior 61.

<Rechargeable Storage Battery 71>

The rechargeable storage battery 71 may be, for example, a rechargeable battery, such as a lithium-ion storage battery and a capacitor.

<Switching Unit 72>

The switching unit 72 switches an object to which the transmission-side conversion unit 52 is connected (connection destination) between the rechargeable storage battery 71 and an external power source 73. When the connection destination of the transmission-side conversion unit 52 is set to the rechargeable storage battery 71 by the switching unit 72, the power transmitting device 51 operates on the power of the rechargeable storage battery 71. When the connection destination of the transmission-side conversion unit 52 is set to the external power source 73 by the switching unit 72, the power transmitting device 51 operates on the power of the external power source 73. The switching unit 72 is controlled by the transmission-side controlling device 55.

The external power source 73 is a power source provided outside the power transmitting device 51. The external power source 73 may be, for example, a system power source. When the building includes a power generator such as a solar photovoltaic power generator, the generator may be used as the external power source 73.

<Communication Unit 74>

The communication unit 74 may perform communication according to any communication standards such as Bluetooth, Wi-Fi, or ZigBee. The communication unit 74 may also be used as the transmission-side communication unit 54. The communication unit 74 may be connected to the panel-side communication unit 65 by wire.

<Control Performed in Second Embodiment>

In the power transmitting device 51 of the second embodiment, the power transmission mode is switched in accordance with operation of the operation unit 63 by the person M1. Hereinafter, controls performed by the operation determining unit 64 and the transmission-side controlling device 55 to switch the power transmission mode will be described. First, a power transmission mode determining control performed by the operation determining unit 64 will be described.

<Step S21>

Figure 7:
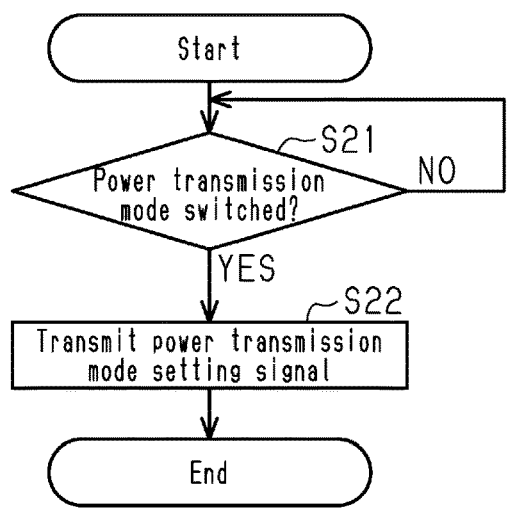
FIG. 7 is a flowchart showing a power transmission mode determining control performed by an operation determining unit of the control panel shown in FIG. 6.

As shown in FIG. 7, in step S21, the operation determining unit 64 determines whether the power transmission mode has been switched. When the operation unit 63 is operated, the operation determining unit 64 determines that the power transmission mode is switched. When the operation unit 63 is not operated, the operation determining unit 64 determines that the power transmission mode is not switched. If the determination result of step S21 is negative, the operation determining unit 64 performs the process of step S21 again. If the determination result of step S21 is affirmative, the operation determining unit 64 performs the process of step S22.

<Step S22>

In step S22, the operation determining unit 64 transmits a power transmission mode setting signal from the panel-side communication unit 65. The power transmission mode setting signal is a signal including information that indicates the power transmission mode designated by the operation unit 63. If the operation unit 63 is a lever, the operation determining unit 64 acquires the power transmission mode designated by the operation unit 63 based on the position of the lever, and transmits the power transmission mode setting signal including information indicating the designated power transmission mode. When completing the process of step S22, the operation determining unit 64 ends the power transmission mode determining control.

<Switching Control>

The transmission-side controlling device 55 of the second embodiment performs a switching control in accordance with an operation of the operation unit 63. The switching control performed by the transmission-side controlling device 55 of the second embodiment will now be described.

<Step S31>

Figure 8:
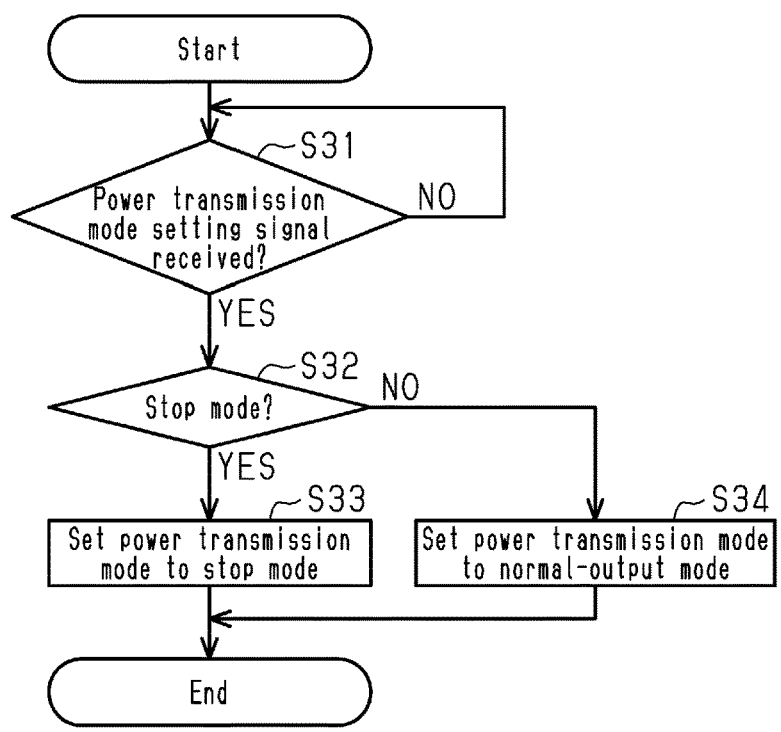
FIG. 8 is a flowchart showing a switching control performed by a transmission-side controlling device of the contactless power supply system shown in FIG. 6.

As shown in FIG. 8, in step S31, the transmission-side controlling device 55 determines whether the power transmission mode setting signal has been received via the communication unit 74. In other words, the transmission-side controlling device 55 determines whether an instruction for switching the power transmission mode has been given by the person M1 operating the operation unit 63. If the determination result of step S31 is negative, the transmission-side controlling device 55 performs the process of step S31 again. If the determination result of step S31 is affirmative, the transmission-side controlling device 55 performs the process of step S32.

<Step S32>

In step S32, the transmission-side controlling device 55 determines, from the power transmission mode setting signal, whether the power transmission mode designated by the operation of the operation unit 63 is the stop mode. If the determination result of step S32 is affirmative, the transmission-side controlling device 55 performs the process of step S33. If the determination result of step S32 is negative, the transmission-side controlling device 55 performs the process of step S34.

<Step S33>

In step S33, the transmission-side controlling device 55 sets the power transmission mode to the stop mode. In the stop mode, the power transmitting device 51 operates using the power of the rechargeable storage battery 71. More specifically, the operation of the transmission-side controlling device 55 and the transmission of the communication signal W2 are performed using the power of the rechargeable storage battery 71. When completing the process of step S33, the transmission-side controlling device 55 ends the switching control.

<Step S34>

In step S34, the transmission-side controlling device 55 sets the power transmission mode to the normal-output mode. In the normal-output mode, the transmission-side controlling device 55 operates using the power from the external power source 73. When completing the process of step S34, the transmission-side controlling device 55 ends the switching control.

Operation of Second Embodiment

Operation of the second embodiment will now be described.

The person M1 can operate the operation unit 63 when entering the room interior 61. The person M1 can designate the power transmission mode of the power transmitting device 51 by operating the operation unit 63. When the stop mode is designated as the power transmission mode through the operation of the operation unit 63, the operation determining unit 64 transmits a transmission mode setting signal including information indicating the stop mode. Accordingly, the transmission-side controlling device 55 sets the power transmission mode to the stop mode. In the second embodiment, the operation of the operation unit 63 is regarded as the limit instruction from the person M1. The limit instruction given by the operation of the operation unit 63 is input to the power transmitting device 51 through communication between the panel-side communication unit 65 and the communication unit 74. In the second embodiment, the communication unit 74 is the reception unit.

Advantages of Second Embodiment

The second embodiment has the following advantages.

(2-1) The person M1 can set the power transmission mode to the stop mode when entering the room interior 61. When the person M1 is present inside the room interior 61, it is possible to reduce human exposure to electromagnetic waves as compared with a case in which the power transmission mode is the normal-output mode.

(2-2) The power transmitting device 51 operates on the power from the rechargeable storage battery 71 during the stop mode. Since the power consumption in the power transmitting device 51 is reduced during the stop mode, the power transmitting device 51 can be operated by using the rechargeable storage battery 71. This reduces the consumption of the power of the external power source 73.

<Modifications>

The above-described embodiments may be modified as follows. The above-described embodiments and the following modifications can be combined as long as the combined modifications remain technically consistent with each other.

In each of the embodiments, the limit mode may be a low-output mode. The low-output mode is a power transmission mode in which power lower than that in the normal-output mode is transmitted. Even in this case, human exposure to electromagnetic waves is suppressed as compared with a case in which the power transmission mode is the normal-output mode.

In each of the embodiments, the limit mode may include both of the stop mode and the low-output mode. In the first embodiment, when the registered key is present inside the passenger compartment 11, the person M1 may be able to select in advance whether to set the power transmission mode to the stop mode or the low-output mode. In addition, the transmission-side controlling device 55 may switch between the stop mode and the low-output mode in accordance with the charging status of the reception-side power storage unit 44 when the registered key is present inside the passenger compartment 11. For example, when the state of charge of the reception-side power storage unit 44 is lower than a threshold, the transmission-side controlling device 55 sets the power transmission mode to the stop mode, thereby preventing the remaining power of the reception-side power storage unit 44 from being exhausted. The transmission-side controlling device 55 sets the power transmission mode to the low-output mode to perform power transmission when the state of charge of the reception-side power storage unit 44 is higher than or equal to the threshold. The threshold is a predetermined value. In the second embodiment, the person M1 may be able to select, using the operation unit 63, whether to set the power transmission mode to the stop mode or the low-output mode.

In each of the embodiments, the contactless power supply system 40 may supply power by an electromagnetic induction method, a magnetic field resonance method, or an electric field resonance method. Since electromagnetic waves are generated when contactless power supply is performed in any method, human exposure to electromagnetic waves is suppressed by performing the control of each embodiment.

In the first embodiment, the starting condition does not necessarily need to be used. In this case, when it is determined that the registered key is not present inside the passenger compartment 11, the transmission-side controlling device 55 may set the power transmission mode to the normal-output mode.

In the first embodiment, if the determination result of step S3 is negative, the vehicle on-board controlling device 22 does not necessarily need to perform the process of step S5. In this case, when receiving the presence/absence signal in step S11, the transmission-side controlling device 55 performs the process of step S12. When receiving no presence/absence signal, the transmission-side controlling device 55 performs the process of step S13.

In the first embodiment, the transmission-side controlling device 55 may set the power transmission mode to the stop mode even if an electronic key 31 different from the registered key is present inside the passenger compartment 11.

In the first embodiment, the vehicle 10 may be connectable to an external power source. The external power source is a power source provided outside the vehicle 10. The external power source may be, for example, a system power source. In this case, the power transmitting device 51 may be operated using the power of the external power source. In addition, as in the second embodiment, the switching unit 72 may switch between the external power source and the power source 12.

Figure 9:
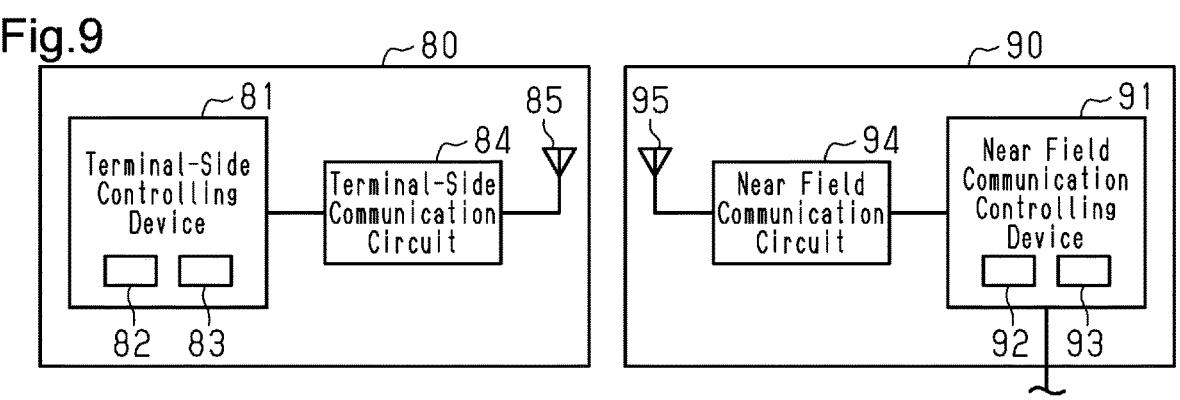
FIG. 9 is a schematic diagram of a portable communication terminal and a near field communication device according to a modification.

As shown in FIG. 9, in the first embodiment, the device carried by the person M1 may be a portable communication terminal 80. In this case, a near field communication device 90 mounted on the vehicle 10 determines whether the portable communication terminal 80 is present inside the passenger compartment 11. The near field communication device 90 may be, for example, a car navigation system or a remote control system. The portable communication terminal 80 may be, for example, a smartphone or a wearable terminal.

The portable communication terminal 80 includes a terminal-side controlling device 81, a terminal-side communication circuit 84, and a terminal-side antenna 85. The terminal-side controlling device 81 includes a processor 82 and a memory unit 83. The hardware configuration of the terminal-side controlling device 81 is, for example, similar to that of the vehicle on-board controlling device 22. The terminal-side communication circuit 84 performs communication according to communication standards such as Bluetooth, Wi-Fi, or ZigBee. The terminal-side communication circuit 84 transmits and receives wireless signals via the terminal-side antenna 85.

The near field communication device 90 includes a near field communication controlling device 91, a near field communication circuit 94, and a near field communication antenna 95. The near field communication controlling device 91 includes a processor 92 and a memory unit 93. The hardware configuration of the near field communication controlling device 91 is, for example, similar to that of the vehicle on-board controlling device 22. The near field communication controlling device 91 and the transmission-side controlling device 55 communicate with each other using a communication protocol such as CAN or LIN. The near field communication circuit 94 performs communication according to communication standards such as Bluetooth, Wi-Fi, or ZigBee. The near field communication circuit 94 transmits and receives wireless signals via the near field communication antenna 95.

The portable communication terminal 80 and the near field communication device 90 are configured to communicate with each other using the terminal-side communication circuit 84 and the near field communication circuit 94. Hereinafter, for example, a case in which Bluetooth is used as the communication standard will be described.

The near field communication device 90 transmits an advertising signal. When receiving the advertising signal, the portable communication terminal 80 transmits a connection request signal. The near field communication device 90 may determine whether the portable communication terminal 80 is present inside the passenger compartment 11 using the connection request signal. For example, in a case in which multiple near field communication antennas 95 are provided, the near field communication controlling device 91 may determine whether the portable communication terminal 80 is present inside the passenger compartment 11 based on which of the near field communication antennas 95 has received the connection request signal. The near field communication controlling device 91 may determine whether the portable communication terminal 80 is present inside the passenger compartment 11 based on the reception strength of the connection request signal. The near field communication controlling device 91 may determine whether the portable communication terminal 80 is present inside the passenger compartment 11 based on the reception strength of a signal transmitted from the portable communication terminal 80 after the connection is established. The near field communication controlling device 91 may determine that the portable communication terminal 80 is present inside the passenger compartment 11 when the connection between the near field communication device 90 and the portable communication terminal 80 is established.

The near field communication controlling device 91 may measure the position of the portable communication terminal 80 using the angle of arrival (AoA) of a signal transmitted from the portable communication terminal 80. The near field communication controlling device 91 may measure the position of the portable communication terminal 80 using the time of flight (ToF) of a signal transmitted from the portable communication terminal 80. Then, the near field communication controlling device 91 may determine whether the portable communication terminal 80 is present inside the passenger compartment 11 from the position of the portable communication terminal 80.

The near field communication controlling device 91 transmits, to the transmission-side controlling device 55, the determination result indicating whether the portable communication terminal 80 is present inside the passenger compartment 11. The transmission-side controlling device 55 determines whether the portable communication terminal 80 is present inside the passenger compartment 11 from the determination result of the near field communication controlling device 91. In this case, the near field communication device 90 is the determination device. When the portable communication terminal 80 is present inside the passenger compartment 11, the transmission-side controlling device 55 performs the same control as that performed when the registered key is present inside the passenger compartment 11.

In the second embodiment, the near field communication device 90 described above may be provided in the room interior 61 instead of the control panel 62. In this case, the near field communication device 90 may be, for example, a router or an access point. The near field communication device 90 determines whether the portable communication terminal 80 is present in the room interior 61. The near field communication device 90 transmits, to the power transmitting device 51, a signal including the determination result indicating whether the portable communication terminal 80 is present in the room interior 61. When the portable communication terminal 80 is present in the room interior 61, the power transmitting device 51 sets the power transmission mode to the stop mode. When the portable communication terminal 80 is not present in the room interior 61, the power transmitting device 51 sets the power transmission mode to the normal-output mode. For example, the transmission-side controlling device 55 may perform a control similar to that in the first embodiment.

In the second embodiment, the control panel 62 may include a display unit. The display unit may display the current power transmission mode. This notifies the person M1 of the power transmission mode.

In the second embodiment, the operation unit 63 may be connected to the transmission-side controlling device 55. In this case, transmission-side controlling device 55 determines the power transmission mode designated by the person M1 from operation of the operation unit 63. The transmission-side controlling device 55 sets the power transmission mode designated by the person M1. In this case, the transmission-side controlling device 55 is the reception unit.

In the first embodiment, the vehicle 10 may be provided with a motion detection camera. In this case, when the motion detection camera detects the person M1 the transmission-side controlling device 55 sets the power transmission mode to the stop mode.

In the second embodiment, the transmission-side controlling device 55 may switch the power transmission mode through voice input. In this case, the control panel 62 includes a microphone for voice input. Also, the transmission-side controlling device 55 may switch the power transmission mode through a gesture by the person M1. In this case, the control panel 62 includes a camera.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A power transmitting device that performs power transmission to a power receiving device, the power receiving device being provided in a space that a person can enter or exit, the power transmitting device comprising:
   a power transmitting unit configured to perform power transmission to the power receiving device through contactless power supply;
   processing circuitry configured to switch a power transmission mode of the power transmitting unit between a normal-output mode and a limit mode in which a transmitted power is more limited than in the normal-output mode; and
   a reception unit configured to receive a limit instruction for the power transmission given by the person,
   wherein the processing circuitry is configured to set the power transmission mode to the limit mode when the reception unit receives the limit instruction.

2. The power transmitting device according to claim 1, wherein
   the reception unit is configured to
      communicate with a determination device that determines whether a device carried by the person is present inside the space, and
      obtain, from the determination device, a determination result as to whether the carried device is present inside the space, and
   the processing circuitry is configured to
      determine whether the carried device is present inside the space based on the determination result, and
      determine that the limit instruction has been received if the carried device is present inside the space.

3. The power transmitting device according to claim 2, wherein the processing circuitry is configured to set the power transmission mode to the normal-output mode when the processing circuitry determines that the carried device is not present inside the space and a starting condition is satisfied.

4. The power transmitting device according to claim 1, wherein the limit mode includes a stop mode in which the power transmission is stopped.

5. A power transmitting method of performing power transmission to a power receiving device, the power receiving device being provided in a space that a person can enter or exit, the power transmitting method comprising:
- performing power transmission to the power receiving device through contactless power supply;
- switching a power transmission mode that is used when the power transmission is performed between a normal-output mode and a limit mode in which a transmitted power is more limited than in the normal-output mode; and
- receiving a limit instruction for the power transmission given by the person,
- wherein the switching the power transmission mode includes setting the power transmission mode to the limit mode when the limit instruction is received.

* * * * *